Figure 1:
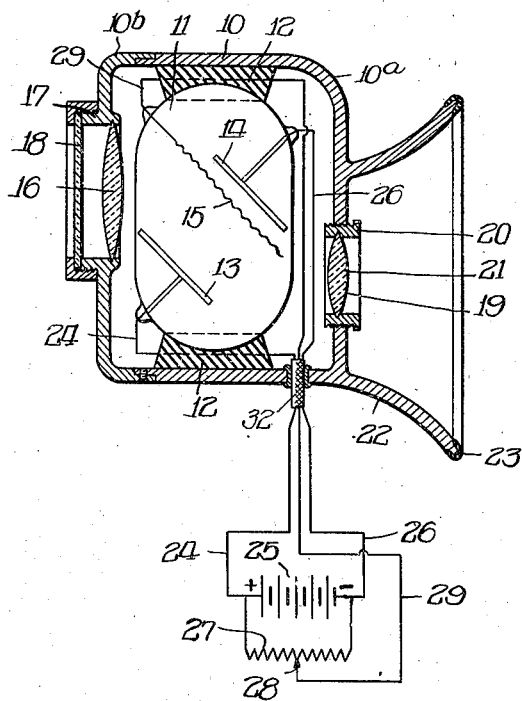

Oct. 27, 1936.  A. A. ARNHYM  2,058,941

CONVERTER FOR LIGHT RAYS

Filed March 30, 1935

Inventor:
Albert A. Arnhym,
By Wilkinson Huxley Byron & Knight
Attys.

Patented Oct. 27, 1936

2,058,941

UNITED STATES PATENT OFFICE 2,058,941

CONVERTER FOR LIGHT RAYS

Albert A. Arnhym, Chicago, Ill., assignor to Akay Electron Co., Chicago, Ill., a corporation of Delaware Application March 30, 1935, Serial No. 13,841

19 Claims. (Cl. 250—41.5)

The present invention relates to converters for light rays.

More particularly the present invention, in certain of its aspects, relates to means for converting light rays at the two ends of the spectrum, invisible to the human eye, into visible rays. The invention will be described particularly in connection with means for converting the infra-red rays of the spectrum into visible rays. However, its applicability to the converting of ultra-violet rays at the other end of the spectrum will be apparent as the description proceeds. As the description proceeds it will be apparent that the invention also relates to means for amplifying or intensifying or multiplying the effect of light rays from other parts or all parts of the spectrum, thereby improving the visibility of objects within the field of view of the instrument. Its applicability to photography will also be apparent as the description proceeds.

An object of the present invention is to provide efficient means for converting invisible rays into visible rays.

A further object is to provide a construction utilizing certain of the characteristics of a photoelectric cell to the end that invisible light rays may be converted into visible rays, or to the end that the effect of light rays from any part or all parts of the spectrum may be amplified.

A further object is to provide an efficient invisible ray converter or a light amplifier which is compact and readily portable.

A further object is to provide a construction of the type above referred to which may be readily utilized in the form of spectacles or goggles which may be worn before the eyes of the user.

Further objects will appear as the description proceeds.

Referring to the drawing—

Figure 2:
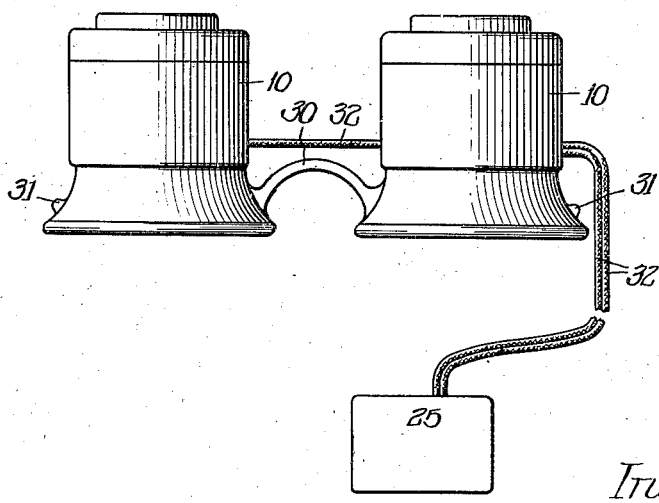

Figure 1 represents more or less diagrammatically one embodiment of the present invention; and Figure 2 is a view representing the use of the invention in goggles or spectacles.

The numeral 10 indicates a casing, which may be of light metal, or it may be made of molded composition, and it preferably includes two separable parts 10a and 10b to permit ready access to the interior. Disposed within said casing is a bulb 11, which may be a vacuum tube, or, if preferred, may be filled with gas such as commonly used in filling photoelectric cells. Said bulb 11 is fixedly mounted within said casing 10, but should be cushioned against shocks, as for example by means of rubber buffers 12. The bulb 11 will be of glass or other transparent material.

Disposed within the bulb 11 is the anode 13, and preferably in parallel and symmetrical relationship therewith is the cathode 14. The cathode 14 and anode 13 will preferably be flat plates. Disposed between the cathode 14 and the anode 13 and preferably in parallel relationship therewith is the grid 15, which may be composed of a mesh of fine nickel wires. The cathode 14, anode 13 and grid 15 are fixedly disposed relative to each other and relative to the bulb 11, and each has electrical connection with a source of E. M. F. disposed exteriorly of the bulb 11 through wires which will be referred to more in detail presently. If preferred, the grid 15 may be omitted.

Mounted within a wall of the casing 10 at one side of the bulb 11 is the front lens 16 disposed within a corresponding aperture in said casing 10. A ring 17 may be provided for protecting the lens 16 against blows. Said ring 17 may comprise a filter holder, a filter 18 being illustrated in Figure 1 disposed in front of the lens 16. The filter 18 will, of course, be removably mounted, so that the type of filter may be chosen as desired. In the event that the device is to be used for converting infra-red rays, it will be understood that an infra-red filter will be used which will permit the passage through the lens 16 of only the infra-red rays. Other rays which are to be converted may be admitted by suitable selection of the filter 18. Disposed at the back side of the casing 10 is a lens assembly, indicated as a whole by the numeral 19. Said lens assembly includes an exteriorly screw-threaded collar 20 disposed within a corresponding aperture in the back wall of the casing 10. Said collar 20 supports the lens 21, which for purposes of convenience will be referred to as the back lens. The front lens 16 will be so mounted relative to the bulb 11 and the cathode 14 that light rays passing through said lens will be focused upon the cathode 14. The focal length of the lens 16 may in practice be so short that said lens 16 may be considered to be of universal focus. The back lens 19 will be so disposed relative to the anode 13 that light rays emitted from said anode 13 will be directed rearwardly through said back lens 19 to the eye of the observer. By reason of the screw-threaded collar 20, the distance from the lens 21 to the anode 13 may be adjusted to suit the eye of the observer.

Disposed around the lens assembly 19 is the lens hood 22 provided with a cushioning ring 23 adapted to fit the face of an observer around his eyes, whereby to block out stray light. The lens 16 or the lens assembly 19 will preferably be so constructed as to present an upright image to the observer.

The bulb 11 with the elements contained therein is a photoelectric cell. The anode 13 is connected through the conductor 24 with the positive terminal of a source of E. M. F., indicated by the numeral 25. The negative terminal of said source of E. M. F. 25 is connected through the conductor 26 with the cathode 14. Connected across the terminals of the source of E. M. F. 25 is the resistor 27 having in contact therewith the movable tap 28, which may connect with any portion of said resistor 27. Said tap 28 is connected through the conductor 29 with the grid 15. The cathode 14, on the side thereof which is presented toward the lens 16, will be coated with a layer of a material responsive to the light rays focused upon it by the lens 16. In the event that the apparatus is to be used for the conversion of infra-red rays, the cathode 14 will be coated with a layer of caesium, or any equivalent thereof which will emit electrons under the influence of the infra-red rays. For the conversion or intensification of other rays, of course, the coating, as well as the filter, will be suitably chosen by the man skilled in the art. The anode 13 will be covered with a layer of fluorescent material, such for example as zinc silicate, which under the effect of the electrons will give off visible light rays. If preferred, the anode may, of course, be composed entirely of fluorescent material.

The mode of operation of the above described embodiment of the present invention will be clear without detailed explanation. The lens 16 will focus light rays upon the cathode 14. Electrons emitted by the cathode 14 will be proportional to the brightness of the corresponding light beams projected upon said cathode 14, thus producing an electrical image of the object projected by said lens 16. By reason of the difference of potential existing between the cathode 14 and the anode 13, these electrons will be accelerated to the anode 13, activating the fluorescent layer upon said anode 13, forming an optical image thereon. This optical image upon the anode 13 can be viewed through the back lens 21. It will be noted that the rays from the lens 16 fall directly upon the photo-electric surface of the cathode 14. The electrons are therefore emitted from such surface as first surface emission, and consequently a strong, distinct, well defined image is formed upon the opposed surface of the anode 13.

It is perfectly practicable to mount two casings 10 adjacent to one another in the form of a pair of spectacles, as illustrated in Figure 2. Referring to said figure, it will be noted that the two casings 10—10 are united by the nose-piece 30. Any preferred means may be utilized for holding the spectacles upon the head of the wearer. Figure 2 shows a pair of lugs 31—31 which may be utilized as mounting means for a support or supports to be disposed on the head of the user.

When the invention is embodied in the form of spectacles, a source of E. M. F. 25 may be embodied in a dry battery, which may be carried in the pocket of the user. Two cables 32—32 may connect the two photoelectric cells with the battery 25.

It will be understood that the invention has a number of practical applications, some of which are the following:

In the case of photography in weak light, one or both of the photoelectric cells may be utilized with or without filters, and the intensification of the effect of light will be accomplished by reason of the acceleration of the electrons from the cathode 14 to the anode 13. Its applicability to photographing through haze or fog by means of an infra-red filter will be at once apparent to those skilled in the art.

In the case of automobile driving, the infra-red rays which are always emitted by ordinary light would penetrate fog and the driver using the present invention would be able to see objects through such fog.

In protection against airplanes in war time, the heated portions of the airplane, such for example as the engine, would emit infra-red rays through any intervening fog or smoke, or through ordinary darkness, and said rays would be rendered visible by means of the present invention.

Airplane pilots can use the invention and fly safely in or above clouds, the infra-red rays from the ground passing through the clouds and being rendered visible by means of the present invention.

Many other practical applications will occur at once to those skilled in the art.

Though the source of E. M. F. has been illustrated as a direct current source, it will be understood by those skilled in the art that an alternating current source of E. M. F. will be operative, the waves of only one polarity being utilized.

Though a preferred embodiment of the present invention has been described in detail, many modifications will occur to those skilled in the art. It is intended to cover all such modifications that fall within the scope of the appended claims.

What is claimed is—

1. In combination, a photoelectric cell including a cathode plate and an anode plate in parallel relationship with one another, one of said plates being provided with a coating which under the effect of light rays will emit electrons, the other of said plates on the side thereof presented toward said first-mentioned coating being provided with a coating of material adapted to emit light rays under the effect of electrons, means for projecting light rays upon the side of said first-mentioned coating presented toward said anode plate, and means for applying a difference of potential to said plates.

2. In a device of the class described, a photoelectric cell having an anode plate and a cathode plate therein disposed oppositely to each other and in parallel relationship with each other, one of said plates having a coating on one side thereof adapted to be presented in unobstructed relationship to a source of light rays, said coating being adapted to emit electrons proportional to the intensity of said light rays, the other of said plates having a coating presented toward said first-mentioned coating, said coating on said other plate being of material adapted to become visible in proportion to the electrons striking it, and means for applying a difference of potential to said plates.

3. In combination, a casing, a photoelectric cell mounted within said casing, said photoelectric cell including a cathode plate and an anode plate, a front lens mounted within said casing and adapted to project rays of light upon said cathode plate, said cathode plate being disposed in angular relationship with the axis of said front lens, said anode plate being disposed opposite to and in parallel relationship with said cathode plate, the surface of said cathode plate presented toward said anode plate being coated with a material which will emit electrons in proportion to the light beams falling thereon, the surface of said anode plate presented toward said cathode plate being coated with material adapted to become luminous in proportion to the electrons striking said coating, and a source of E. M. F. connected to said anode and said cathode plates.

4. In combination, a casing, a photoelectric cell mounted within said casing, said photoelectric cell including a cathode plate and an anode plate, a front lens mounted within said casing and adapted to project rays of light upon said cathode plate, said cathode plate being disposed in angular relationship with the axis of said front lens, said anode plate being disposed opposite to and in parallel relationship with said cathode plate, the surface of said cathode plate presented toward said anode plate being coated with a material which will emit electrons in proportion to the light beams falling thereon, the surface of said anode plate presented toward said cathode plate being coated with material adapted to become luminous in proportion to the electrons striking said coating, a source of E. M. F. connected to said anode and said cathode plates, and a rear lens in said casing positioned to project a luminous image from the coating on said anode plate out of said casing.

5. In combination, a casing, a photoelectric cell mounted within said casing, said photoelectric cell including a cathode plate and an anode plate, a front lens mounted within said casing and adapted to project rays of light upon said cathode plate, said cathode plate being disposed in angular relationship with the axis of said front lens, said anode plate being disposed opposite to and in parallel relationship with said cathode plate, the surface of said cathode plate presented toward said anode plate being coated with a material which will emit electrons in proportion to the light beams falling thereon, the surface of said anode plate presented toward said cathode plate being coated with material adapted to become luminous in proportion to the electrons striking said coating, a grid between said anode plate and said cathode plate, and means for impressing electric potentials upon said anode plate, said cathode plate and said grid.

6. In an article of the class described, a photoelectric cell including a cathode and an anode having faces presented toward each other, the face of said cathode being coated with a substance which is the equivalent of caesium, the face of said anode being coated with a substance adapted to give off light rays in proportion to electrons striking said substance, means for applying a difference of potential to said cathode and said anode and means for directing light beams upon the face of said cathode presented toward said anode.

7. In an article of the class described, a photoelectric cell including a cathode and an anode having faces presented toward each other, the face of said cathode being coated with a substance which is the equivalent of caesium, the face of said anode being coated with a substance adapted to give off light rays in proportion to electrons striking said substance, means for applying a difference of potential to said cathode and said anode, a grid disposed between said faces, said grid being capable of passing light rays therethrough, and means for applying an electrical potential to said grid.

8. In an article of the class described, a photoelectric cell including a cathode and an anode having faces presented toward each other, the face of said cathode being coated with a substance which is the equivalent of caesium, the face of said anode being coated with a substance adapted to give off light rays in proportion to electrons striking said substance, means for applying a difference of potential to said cathode and said anode, and lenses positioned to cooperate with said faces to provide passages for light rays to said cathode and from said anode.

9. In an article of the class described, a photoelectric cell having a cathode coated on one side thereof with a substance which under the effect of light rays emits electrons and an anode having a coating presented to the coated side of said cathode, said coating on said anode being capable of emitting light rays proportional to electrons hitting said coating, a lens for focusing light rays upon the coated side of said cathode, and means for applying a difference of potential to said anode and said cathode.

10. In an article of the class described, a photoelectric cell having a cathode coated on one side thereof with a substance which under the effect of light rays emits electrons and an anode having a coating presented to the coated side of said cathode, said coating on said anode being capable of emitting light rays proportional to electrons hitting said coating, a lens for focusing light rays upon the coated side of said cathode, means for applying a difference of potential to said anode and said cathode, and a lens adapted to be focused upon the coating on said anode.

11. In an article of the class described, a photoelectric cell having a cathode coated on one side thereof with a substance which is the equivalent of caesium and an anode having a coating presented to the coated side of said cathode, said coating being capable of emitting light rays proportional to electrons hitting said coating, a lens for focusing light rays upon the coated side of said cathode, an infra-red filter cooperating with said lens, and means for applying a difference of potential to said anode and said cathode.

12. In an article of the class described, a photoelectric cell having a cathode coated on one side thereof with a substance which is the equivalent of caesium and an anode having a coating presented to the coated side of said cathode, said coating being capable of emitting light rays proportional to electrons hitting said coating, a lens for focusing light rays upon the coated side of said cathode, an infra-red filter cooperating with said lens, means for applying a difference of potential to said anode and said cathode, and a lens adapted to be focused upon the coating on said anode.

13. In an article of the class described, a photoelectric cell including a cathode having a coating of a substance which under the effect of light rays will emit electrons and an anode having a coating presented toward said first-mentioned coating, the coating on said anode being capable of emitting light rays in proportion to the electrons hitting said coating, a lens for focusing light rays upon the coated side of said cathode, and means for viewing light rays emitted by said coating upon said anode.

14. In a pair of spectacles, two casings, each of said casings having associated therewith a lens, said lens being spaced apart a distance to accommodate the vision of a human being, a photoelectric cell mounted within each of said casings, each of said photoelectric cells including a cathode having a coating adapted to emit electrons in response to light striking said coating and an anode having a coating presented toward said first-mentioned coating and adapted to emit light rays in response to electrons emitted by said coating upon said cathode, each of said casings having cooperatively associated therewith a second lens for focusing light rays upon said coating upon said cathode, and means for applying a difference of potential to the cathode and the anode in each of said casings.

15. In a pair of spectacles, two casings, each of said casings having associated therewith a lens, said lens being spaced apart a distance to accommodate the vision of a human being, a photoelectric cell mounted within each of said casings, each of said photoelectric cells including a cathode having a coating adapted to emit electrons in response to light striking said coating and an anode having a coating presented toward said first-mentioned coating and adapted to emit light rays in response to electrons emitted by said coating upon said cathode, each of said casings having cooperatively associated therewith a second lens for focusing light rays upon said coating upon said cathode, means for applying a difference of potential to the cathode and the anode in each of said casings, a grid between the cathode and the anode in each of said photoelectric cells, and means for applying a potential to each of said grids.

16. A light ray converter comprising a photoelectric cell which includes a cathode plate and an anode plate arranged in parallel relationship with one another, means for impressing a difference of electrical potential across said plates, said cathode plate being provided with a coating which under the effect of light rays projected thereon will emit electrons while the anode plate on the side thereof presented toward the coated side of said cathode plate is provided with a coating of material adapted under the effect of such emitted electrons to emit visible light rays, said plates being spaced apart a distance sufficient so that light rays falling upon said first-mentioned coating may form a distinct image upon an extended area of said coating and so that the visible image impressed upon said second-mentioned coating may be observed by an observer.

17. A light ray converter comprising a photoelectric cell which includes a cathode plate and an anode plate arranged in parallel relationship with one another, means for impressing a difference of electrical potential across said plates, said cathode plate being provided with a coating which under the effect of light rays projected thereon will emit electrons while the anode plate on the side thereof presented toward the coated side of said cathode plate is provided with a coating of material adapted under the effect of such emitted electrons to emit visible light rays, said plates being spaced apart a distance sufficient so that light rays falling upon said first-mentioned coating may form a distinct image upon an extended area of said coating and so that the visible image impressed upon said second-mentioned coating may be observed by an observer, and a grid located between said plates, which grid is capable of passing light rays therethrough and which is adapted to have an electrical potential applied thereto.

18. In combination, a photoelectric cell including a cathode plate and an anode plate in parallel relationship with one another, one of said plates being provided with a coating which under the effect of light rays will emit electrons, the other of said plates on the side thereof presented toward said first-mentioned coating being provided with a coating of material adapted to emit light rays under the effect of electrons, means for projecting light rays upon the side of said first-mentioned coating presented toward said anode plate, and means for applying a difference of potential to said plates, said plates being spaced apart sufficiently so that light rays may be projected upon said first-mentioned coating to form a distinct image throughout an extended area of said coating and so that the image formed upon said second-mentioned coating may be viewed by an observer.

19. In an article of the class described, a photoelectric cell including a cathode and an anode having faces presented toward each other, the face of said cathode being coated with a substance which is the equivalent of caesium, the face of said anode being coated with a substance adapted to give off light rays in proportion to electrons striking said substance, and means for applying a difference of potential to said cathode and said anode, said cathode and said anode being spaced apart sufficiently so that light rays may be projected upon the coated face of said cathode to form a distinct image throughout an extended area of said face and so that the image upon the coating of said anode may be viewed by an observer.

ALBERT A. ARNHYM.